(12) United States Patent
Park et al.

(10) Patent No.: US 8,044,143 B2
(45) Date of Patent: Oct. 25, 2011

(54) POLYESTER/POLYCARBONATE ALLOY RESIN COMPOSITION AND MOLDED PRODUCT MADE USING THE SAME

(75) Inventors: Jung-Eun Park, Uiwang-si (KR); Bang-Duk Kim, Uiwang-si (KR); In-Sik Shim, Uiwang-si (KR); Doo-Han Ha, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/641,752

(22) Filed: Dec. 18, 2009

(65) Prior Publication Data
US 2010/0160532 A1 Jun. 24, 2010

(30) Foreign Application Priority Data
Dec. 19, 2008 (KR) .................. 10-2008-0130524

(51) Int. Cl.
*C08F 8/00* (2006.01)

(52) U.S. Cl. ........ 525/148; 525/146; 525/165; 525/166; 525/176; 525/437; 525/439; 525/445; 525/466; 525/468

(58) Field of Classification Search .................. 525/146, 525/148, 165, 166, 176, 437, 439, 445, 466, 525/468
See application file for complete search history.

(56) References Cited

U.S. PATENT DOCUMENTS

| | | | |
|---|---|---|---|
| 4,034,013 A | 7/1977 | Lane | |
| 4,180,494 A | 12/1979 | Fromuth et al. | |
| 4,393,153 A | 7/1983 | Hepp | |
| 4,788,251 A * | 11/1988 | Brown et al. | 525/67 |
| 4,906,202 A | 3/1990 | Germ | |
| 5,068,285 A * | 11/1991 | Laughner | 525/67 |
| 5,308,894 A * | 5/1994 | Laughner | 523/436 |
| 6,545,089 B1 * | 4/2003 | DeRudder et al. | 525/63 |
| 6,653,391 B1 | 11/2003 | Weber et al. | |
| 2003/0032725 A1 * | 2/2003 | Gaggar et al. | 525/67 |

FOREIGN PATENT DOCUMENTS

| | | |
|---|---|---|
| DE | 69829099 T2 | 12/2005 |
| EP | 0033393 A2 | 8/1981 |
| EP | 0180417 A2 | 5/1986 |
| EP | 0528462 A1 | 2/1993 |
| JP | 05-194829 | 8/1993 |
| JP | 2000-327992 | 11/2000 |
| KR | 10-2000-0038719 A | 7/2000 |
| KR | 10-2005-0032100 A | 4/2005 |
| KR | 10-0709878 B1 | 4/2007 |
| KR | 10-2007-0070686 A | 7/2007 |
| KR | 10-2007-0072372 A | 7/2007 |
| KR | 10-2008-0062975 A | 7/2008 |

\* cited by examiner

*Primary Examiner* — David W Wu
*Assistant Examiner* — Robert Jones, Jr.
(74) *Attorney, Agent, or Firm* — Summa, Additon & Ashe, P.A.

(57) ABSTRACT

Disclosed are a polyester/polycarbonate alloy resin composition that includes: (A) a mixed resin including (A-1) a polycarbonate resin having a weight average molecular weight ranging from about 30,000 to about 200,000 g/mol and (A-2) a polyester resin having an intrinsic viscosity of about 0.85 to about 1.52 dl/g; (B) an acryl-based resin; and (C) an impact-reinforcing agent, and a molded product made using the polyester/polycarbonate alloy resin composition.

10 Claims, No Drawings

POLYESTER/POLYCARBONATE ALLOY RESIN COMPOSITION AND MOLDED PRODUCT MADE USING THE SAME

CROSS REFERENCE TO RELATED APPLICATIONS

This application claims priority to and the benefit of Korean Patent Application No. 10-2008-0130524 filed in the Korean Intellectual Property Office on Dec. 19, 2008, the entire disclosure of which is incorporated herein by reference.

FIELD OF THE INVENTION

The present invention relates to a polyester/polycarbonate alloy resin composition and a molded product made using the same.

BACKGROUND OF THE INVENTION

Polybutylene terephthalate resin has good mechanical and electrical properties and chemical resistance. In particular, it has a rapid crystallization rate, which gives the polybutylene terephthalate excellent molding characteristics. For this reason, polybutylene terephthalate is drawing attention as a thermosetting resin for injection molding and as a substitute for metal, and it is used in automotive, electric, and electronic industries. However, since polybutylene terephthalate resin has a glass transition temperature of about 40 to 60° C., it has a low thermal distortion temperature. Also, since polybutylene terephthalate has low impact resistance at room temperature as well as a low thermal distortion temperature, research has focused on the development of a polyester/polycarbonate alloy for high impact resistance applications.

U.S. Pat. Nos. 4,393,153, 4,180,494, 4,906,202, and 4,034,013 disclose a method of improving impact resistance by adding ethylene-propylene copolymer (EPR), ethylene-propylene-diene copolymer (EPDM), or a methylmethacrylate-butadiene-styrene copolymer (MBS) into a polyester resin. However, when these additives are added without a compatibilizer, the phases of polyester and polycarbonate become unstable, which may lead to deterioration of mechanical properties.

European Patent Nos. 33,393 and 180,417 disclose a method of increasing compatibility by introducing a functional group into a polyester resin, or a method of cross-linking a terminal group of a polyester resin. The above methods may improve the impact resistance of a polyester resin but they leave un-reacted functional groups, which can cause a color change and generate gas during injection molding. In particular, when glycidyl methacrylate is used, the external surface of an injection molded product can turn milky-white so that the product typically has to be painted before use.

SUMMARY OF THE INVENTION

One aspect of the present invention provides a polyester/polycarbonate alloy resin composition having excellent impact resistance, heat resistance, and injection molding appearance.

Another aspect of the present invention provides a molded product made using the polyester/polycarbonate alloy resin composition.

According to one aspect of the present invention, a polyester/polycarbonate alloy resin composition is provided that includes: (A) about 100 parts by weight of a mixed resin including (A-1) about 10 to about 60 wt % of a polycarbonate resin having a weight average molecular weight ranging from about 30,000 to about 200,000 g/mol and (A-2) about 40 to about 90 wt % of a polyester resin having an intrinsic viscosity of about 0.85 to about 1.52 dl/g; (B) about 0.1 to about 10 parts by weight of an acryl-based resin; and (C) about 1 to about 30 parts by weight of an impact-reinforcing agent.

The polycarbonate resin (A-1) may have a weight average molecular weight ranging from about 30,000 to about 50,000 g/mol.

The polycarbonate resin (A-1) may be prepared by reacting one or more diphenols with phosgene, halogen formate, carbonate ester, or a combination thereof.

The polyester resin (A-2) may include polybutylene terephthalate.

The polyester resin (A-2) may have an intrinsic viscosity [η] of about 1.03 to about 1.22 dl/g.

The acryl-based resin (B) may be a terpolymer comprising an alkyl ester (meth)acrylate monomer, an ester (meth)acrylate monomer, or a combination thereof; an aromatic vinyl monomer comprising styrene, o-ethyl styrene, m-ethyl styrene, p-ethyl styrene, alpha-methyl styrene or a combination thereof; and an unsaturated nitrile monomer comprising acrylonitrile, methacrylonitrile, ethacrylonitrile, or a combination thereof.

The impact-reinforcing agent (C) may include a core-shell type copolymer, a linear olefin-based copolymer, or a combination thereof. The core-shell type copolymer may include a rubbery polymer obtained by polymerizing a diene-based monomer, an acryl-based monomer, a silicon-based monomer, or a combination thereof and at least one unsaturated monomer grafted thereon. The unsaturated monomer can include an acryl-based monomer, an aromatic vinyl monomer, an unsaturated nitrile monomer, or a combination thereof. The linear olefin-based copolymer may include a copolymer of an olefin-based monomer and an acryl-based monomer.

The polyester/polycarbonate alloy resin composition may further include one or more additives such as an antibacterial agent, a heat stabilizer, an antioxidant, a release agent, a light stabilizer, a compatibilizer, a dye, an inorganic material additive, a surfactant, a coupling agent, a plasticizer, an admixture, a colorant, a stabilizer, a lubricant, an antistatic agent, a pigment, a flameproofing agent, a weather-resistance agent, a ultraviolet (UV) blocking agent, a filler, a nucleating agent, an adhesion aid, an adhesive, a flame retardant, or a combination thereof.

According to another aspect of the present invention, a molded product made using the polyester/polycarbonate alloy resin composition is provided.

Hereinafter, further aspects of the present invention will be described in detail.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, unless another specific definition is otherwise provided, the term "(meth)acrylic acid alkyl ester" refers to "acrylic acid alkyl ester" or "methacrylic acid alkyl ester", and the term "(meth)acrylic acid ester" refers to "acrylic acid ester" or "methacrylic acid ester".

The term "(meth)acrylonitrile" refers to "acrylonitrile" or "methacrylonitrile", the term "(meth)acrylate" refers to "acrylate" or "methacrylate", and the term "alkyl(meth)acrylate" refers to "alkylacrylate" or "alkylmethacrylate".

The polyester/polycarbonate alloy resin composition according to the embodiments includes: (A) a mixed resin including (A-1) a polycarbonate resin having a weight average molecular weight ranging from about 30,000 to about 50,000 g/mol and (A-2) a polyester resin having an intrinsic viscosity of about 0.85 to about 1.52 dl/g; (B) an acryl-based resin; and (C) an impact-reinforcing agent.

Exemplary components included in the polyester/polycarbonate alloy resin composition according to embodiments will hereinafter be described in detail. However, these embodiments are only exemplary, and the present invention is not limited thereto.

(A) Mixed Resin (A-1) Polycarbonate Resin

The polycarbonate resin may be prepared by reacting one or more diphenols of the following Formula 1 with phosgene, halogen formate, carbonate ester, or a combination thereof.

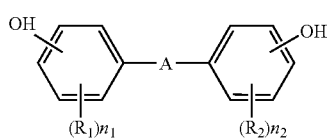

[Chemical Formula 1]

In the above Chemical Formula 1,

A is a single bond, substituted or unsubstituted C1 to C5 alkylene, substituted or unsubstituted C2 to C5 alkylidene, substituted or unsubstituted C5 or C6 cycloalkylene, substituted or unsubstituted C5 to C6 cycloalkylidene, CO, S, or $SO_2$, each $R_1$ and $R_2$ is independently substituted or unsubstituted C1 to C30 alkyl or substituted or unsubstituted C6 to C30 aryl, and $n_1$ and $n_2$ are each independently integers ranging from 0 to 4.

As used herein, the term "substituted" refers to one substituted with at least a substituent comprising halogen, C1 to C30 alkyl, C1 to C30 haloalkyl, C6 to C30 aryl, C1 to C20 alkoxy, or a combination thereof.

The diphenols represented by the above Chemical Formula 1 may be used in combinations to constitute repeating units of the polycarbonate resin. Non-limiting examples of the diphenols include hydroquinone, resorcinol, 4,4'-dihydroxydiphenyl, 2,2-bis(4-hydroxyphenyl)-propane (referred to as "bisphenol-A"), 2,4-bis(4-hydroxyphenyl)-2-methylbutane, 1,1-bis(4-hydroxyphenyl)-cyclohexane, 2,2-bis(3-chloro-4-hydroxyphenyl)-propane, 2,2-bis(3,5-dichloro-4-hydroxyphenyl)-propane, and the like, and combinations thereof. In one embodiment, 2,2-bis(4-hydroxyphenyl)-propane, 2,2-bis(3,5-dichloro-4-hydroxyphenyl)-propane, or 1,1-bis(4-hydroxyphenyl)-cyclohexane of the diphenols may be used, and in another embodiment, 2,2-bis(4-hydroxyphenyl)-propane may be used.

The polycarbonate resin may have a weight average molecular weight ranging from about 10,000 to about 200,000, for example about 30,000 to about 200,000, for example about 30,000 to about 80,000, for example about 30,000 to about 50,000, but the present invention is not limited thereto.

Within the above ranges, properties such as excellent impact strength and excellent processibility due to appropriate fluidity may be obtained.

The polycarbonate resin may be a mixture of copolymers prepared from two or more different diphenols. The polycarbonate resin may include a linear polycarbonate resin, a branched polycarbonate resin, a polyester carbonate copolymer, and the like, or a combination thereof.

The linear polycarbonate resin may include a bisphenol-A based polycarbonate resin. The branched polycarbonate resin may include one produced by reacting a multi-functional aromatic compound such as trimellitic anhydride, trimellitic acid, and the like with diphenols and a carbonate. The multi-functional aromatic compound may be included in an amount of about 0.05 to about 2 mol % based on the total weight of the branched polycarbonate resin. The polyester carbonate copolymer resin may be prepared by reacting a difunctional carboxylic acid with diphenols and carbonate. The carbonate may include a diaryl carbonate such as diphenyl carbonate, and ethylene carbonate.

(A-2) Polyester Resin

The polyester resin is an aromatic polyester resin, and it may be a condensation-polymerized resin obtained from melt polymerization of terephthalic acid or alkyl ester terephthalate, and a C2 to C10 glycol component. As used herein with reference to the alkyl ester terephthalate, the alkyl may be a C1 to C10 alkyl.

Non-limiting examples of the aromatic polyester resin include polyethylene terephthalate resin, polytrimethylene terephthalate resin, polybutylene terephthalate resin, polyhexamethylene terephthalate resin, polycyclohexane dimethylene terephthalate resin, a polyester resin reformed into an amorphous resin by mixing the resins with a monomer, and combinations thereof. Among the resins, polyethylene terephthalate resin, polytrimethylene terephthalate resin, polybutylene terephthalate resin, amorphous polyethylene terephthalate resin, or a combination thereof may be used as the aromatic polyester resin.

The polyester resin has an intrinsic viscosity[η] of about 0.85 to about 1.52 dl/g, for example about 1.03 to about 1.22 dl/g. Within the intrinsic viscosity [η] ranges, the polyester resin may acquire excellent mechanical properties and molding characteristics.

According to one embodiment, the polyester resin includes polybutylene terephthalate.

Polybutylene terephthalate is a condensation-polymerized polymer obtained through a direct ester reaction or an ester exchange reaction of 1,4-butanediol, and terephthalic acid or dimethyl terephthalate.

Also, to increase the impact strength of the resin, the polybutylene terephthalate may be copolymerized with polytetramethylene glycol (PTMG), polyethylene glycol (PEG), polypropylene glycol (PPG), or a low molecular-weight aliphatic polyester or aliphatic polyamide, or it may be used in the form of a modified polybutylene terephthalate obtained by blending with a component improving the impact strength.

According to an embodiment, the mixed resin (A) may include about 10 to about 60 wt % of a polycarbonate resin (A-1) and about 40 to about 90 wt % of a polyester resin (A-2), for example about 10 to about 49 wt % of a polycarbonate resin (A-1) and about 51 to about 90 wt % of a polyester resin (A-2), and as another example about 30 to about 40 wt % of a polycarbonate resin (A-1) and about 60 to about 70 wt % of a polyester resin (A-2). When the content of the polycarbonate resin and the polyester resin falls in the above ranges, polycarbonate resin can exhibit excellent heat resistance and impact resistance, as well as excellent chemical resistance and weather resistance.

(B) Acryl-Based Resin

The acryl-based resin is a terpolymer obtained by mixing an alkyl ester (meth)acrylate monomer, an ester (meth)acrylate monomer, or a combination thereof; an aromatic vinyl monomer; and an unsaturated nitrile monomer.

The alkyl ester (meth)acrylate monomer includes a C1 to C10 alkyl group. Non-limiting examples of the alkyl ester (meth)acrylate monomer include methyl(meth)acrylate, ethyl(meth)acrylate, butyl(meth)acrylate, and the like, and combinations thereof. Non-limiting examples of the ester (meth)acrylate monomer include (meth)acrylate, and the like, and combinations thereof.

Non-limiting examples of the aromatic vinyl monomer include styrene, o-ethyl styrene, m-ethyl styrene, p-ethyl styrene, alpha-methyl styrene, and the like, and combinations thereof.

Non-limiting examples of the unsaturated nitrile monomer include acrylonitrile, methacrylonitrile, ethacrylonitrile, and the like, and combinations thereof.

The acryl-based resin may be included in an amount of about 0.1 to about 10 parts by weight based on about 100 parts by weight of a mixed resin of polycarbonate resin and polyester resin, for example about 0.5 to about 5 parts by weight. Within these ranges, the acryl-based resin can have excellent compatibility with the mixed resin and thus can reduce deterioration in mechanical properties. The acryl-based resin can also impart excellent heat resistance to the resin composition.

(C) Impact-Reinforcing Agent

The impact-reinforcing agent may include a core-shell type copolymer, a linear olefin-based copolymer, or a combination thereof.

The core-shell type copolymer has a core-shell structure where unsaturated monomers are grafted on a rubber core to form a hard shell. The core-shell type copolymer is prepared by graft-polymerizing an unsaturated monomer on a rubbery copolymer. The rubbery copolymer is formed by polymerizing a monomer comprising a diene-based monomer, an acryl-based monomer, a silicon-based monomer, or a combination thereof. The unsaturated monomer comprises an acryl-based monomer, an aromatic vinyl monomer, a unsaturated nitrile monomer, or a combination thereof.

Non-limiting examples of the diene-based monomer include butadiene, isoprene, and the like, and combinations thereof.

Non-limiting examples of the acryl-based monomer include methylacrylate, ethylacrylate, n-propylacrylate, n-butylacrylate, 2-ethylhexylacrylate, hexylmethacrylate, 2-ethyl hexyl methacrylate, and the like, and combinations thereof. A curing agent such as ethylene glycol dimethacrylate, propylene glycol dimethacrylate, 1,3-butylene glycol dimethacrylate, 1,4-butylene glycol dimethacrylate, allylmethacrylate, triallylcyanurate, and the like, and combinations thereof may be used.

The silicon-based monomer is obtained from a cyclosiloxane. Non-limiting examples of the cyclosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. A curing agent such as trimethoxymethylsilane, triethoxyphenylsilane, tetramethoxysilane, tetraethoxysilane, and the like, and combinations thereof may be used.

The rubbery polymer may have a rubber average particle diameter of about 0.4 to about 1 µm to improve the balance of impact resistance and colorfastness.

The impact-reinforcing agent includes the rubber polymer in an amount of about 20 to about 80 wt %. Within this range, the improvement in the impact reinforcement effect and heat resistance may be maximized and the fluidity can be significantly improved.

The acryl-based monomer of the unsaturated monomer may include a (meth)acrylic acid alkyl ester, (meth)acrylic acid ester, or a combination thereof. As used herein with reference to the (meth)acrylic acid alkyl ester, the alkyl may be a C1 to C10 alkyl. Non-limiting examples of the (meth)acrylic acid alkyl ester include methyl(meth)acrylate, ethyl(meth)acrylate, propyl(meth)acrylate, butyl(meth)acrylate, and the like, and combinations thereof. Non-limiting examples of the (meth)acrylic acid ester include (meth)acrylate, and the like, and combinations thereof.

Non-limiting examples of the aromatic vinyl monomer of the unsaturated include styrene, C1-C10 alkyl-substituted styrene, halogen-substituted styrene, and the like, and combinations thereof. Non-limiting examples of the alkyl-substituted styrene include o-ethyl styrene, m-ethyl styrene, p-ethyl styrene, alpha-methyl styrene, and the like, and combinations thereof.

Non-limiting examples of the unsaturated nitrile monomer of the unsaturated monomer include acrylonitrile, methacrylonitrile, ethacrylonitrile, and the like, and combinations thereof.

The linear olefin-based copolymer includes a copolymer of an olefin-based monomer and an acryl-based monomer.

Non-limiting examples of the olefin-based monomer include ethylene, propylene, butylene, isobutylene, and the like, and these may be used singularly or as a mixture.

The acryl-based monomer may include a (meth)acrylic acid alkyl ester, (meth)acrylic acid ester, or a combination thereof. As used herein with reference to the (meth)acrylic acid alkyl ester, the alkyl may be a C1 to C10 alkyl. Non-limiting examples of the (meth)acrylic acid alkyl ester include methyl(meth)acrylate, ethyl(meth)acrylate, propyl (meth)acrylate, butyl(meth)acrylate, and the like, and combinations thereof. Non-limiting examples of the (meth)acrylic acid ester include (meth)acrylate, and the like, and combinations thereof.

The linear olefin-based copolymer may be prepared by using a Ziegler-Natta catalyst, which is a common olefin polymerization catalyst. It may be prepared to have a more selective structure by using a metallocene-based catalyst.

In one embodiment, the impact-reinforcing agent without a functional group may be used in order to prevent color change during injection molding and to improve injection appearance.

The impact-reinforcing agent is included in an amount of about 1 to about 30 parts by weight based on about 100 parts by weight of a mixed resin of polycarbonate resin and polyester resin, for example about 5 to about 15 parts by weight. Within the above ranges, the impact reinforcement effect and an increase in heat resistance of the impact-reinforcing agent may be maximized, and the fluidity may also be improved. Thus, the injection molding characteristics may be improved.

(D) Other Additives

The polyester/polycarbonate alloy resin composition according to an embodiment may further include one or more additives.

Non-limiting examples of the additive(s) include antibacterial agents, heat stabilizers, antioxidants, release agents, light stabilizers, compatibilizers, dyes, inorganic material additives, surfactants, coupling agents, plasticizers, admixtures, colorants, stabilizers, lubricants, antistatic agents, pigments, flameproofing agents, weather-resistance agents, ultraviolet (UV) blocking agents, filler, nucleating agents, adhesion aids, adhesives, flame retardants, and the like, and combinations thereof.

Non-limiting examples of the antioxidant include phenol-based antioxidants, phosphite-based antioxidants, thioether-based antioxidants, amine-based antioxidants, and the like, and combinations thereof.

Non-limiting examples of the release agent include fluorine-containing polymers, silicone oils, metal salts of stearic acid, metal salts of montanic acid, montanic acid ester waxes, polyethylene waxes, and the like, and combinations thereof.

Non-limiting examples of the weather-resistance agent include benzophenone weather-resistance agents, amine weather-resistance agents, and the like, and combinations thereof.

Non-limiting examples of the ultraviolet (UV) blocking agent include titanium dioxide ($TiO_2$), carbon black, and the like, and combinations thereof.

Non-limiting examples of the filler include glass fiber, carbon fiber, silica, mica, alumina, clay, calcium carbonate, calcium sulfate, glass beads, and the like, and combinations thereof. When the filler is added, the mechanical strength and heat resistance may be improved.

Non-limiting examples of the nucleating agent include talc, clay, and the like, and combinations thereof.

The additive may be included in an amount of about 0.1 to about 30 parts by weight based on about 100 parts by weight of the mixed resin of polycarbonate resin and polyester resin. Within this range, the expected effects of the respective additives may be obtained, and excellent mechanical properties and improved surface appearance may be obtained.

The polyester/polycarbonate alloy resin composition according to an embodiment may be prepared by the skilled artisan using methods known in the art. For example, the components and optionally additives as described herein may be mixed, melted in an extruder, and extruded in the form of pellets.

Another embodiment provides a molded product fabricated by molding the polyester/polycarbonate alloy resin composition of the invention. The polyester/polycarbonate alloy resin composition can provide excellent injection molding appearance and impact resistance, and can be used in a variety of molded products without being painted. For example, it may be used for molded external materials of automobiles.

The following examples illustrate the present invention in more detail. However, they are exemplary embodiments and are not limiting.

EXAMPLES

A polyester/polycarbonate alloy resin composition according to an embodiment includes the following components.

(A) Mixed Resin (A-1) Polycarbonate Resin (A-1-1) CALIBRE 200-3 (LG-DOW company) having a weight average molecular weight of 35,000 g/mol is used as a polycarbonate resin.

(A-1-2) PANLITE L 1250WP (Teijin company, Japan) having a weight average molecular weight of 25,000 g/mol is used as a polycarbonate resin.

(A-2) Polyester Resin (A-2-1) DHK 011 (Shinkong company) having an intrinsic viscosity [η] of 1.2 dl/g is used as a polybutylene terephthalate resin.

(A-2-2) DHK 006 (Shinkong company) having an intrinsic viscosity [η] of 0.83 dl/g is used as a polybutylene terephthalate resin.

(B) Acryl-Based Resin

An acryl-based resin having a weight average molecular weight of 120,000 g/mol is used as a copolymer including 75 wt % of a methylmethacrylate (MMA) monomer and 25 wt % of a mixture of a styrene monomer and an acrylonitrile monomer.

(C) Impact-Reinforcing Agent (C-1) Metablen C223-A (MRC company) is used as an impact-reinforcing agent.

(C-2) ELVALOY PTW (DuPont company) having an epoxy group is used as an impact-reinforcing agent.

Examples 1 to 3 and Comparative Examples 1 to 4

The above components in the amounts shown in the following Table 1 are extruded in a typical bi-axial extruder at a feed rate of 60 kg/hr, at a screw speed (RPM) of 250, at a temperature of 250° C., in a screw configuration of 45φ Regular, L/D=36, in the form of pellets.

TABLE 1

| | | | Example | | | Comparative Example | | | |
|---|---|---|---|---|---|---|---|---|---|
| | | | 1 | 2 | 3 | 1 | 2 | 3 | 4 |
| (A) mixed resin | (A-1) poly-carbonate resin (wt %) | (A-1-1) | 52 | 41 | 42 | 52 | — | 40 | 40 |
| | | (A-1-2) | — | — | — | — | 42 | — | — |
| | (A-2) polyester resin (wt %) | (A-2-1) | 48 | 59 | 58 | — | 58 | — | 60 |
| | | (A-2-2) | — | — | — | 48 | — | 60 | — |
| (B) acryl-based resin (parts by weight)* | | | 0.5 | 2 | 4 | 0.5 | 4 | — | — |
| (C) impact-reinforcing agent (parts by weight)* | | C-1 | 8 | 8 | 8 | 8 | 8 | 8 | — |
| | | C-2 | — | — | — | — | — | — | 8 |

*Parts by weight denotes a content unit represented based on 100 parts by weight of the mixed resin (A).

Experimental Examples

The pellets fabricated according to Examples 1 to 3 and Comparative Examples 1 to 4 are dried at 100° C. for more than 3 hours, and molded using a 10-oz injection molder at a molding temperature of 250 to 270° C. and a metal-patterning temperature of 60 to 80° C. to thereby produce specimens. The physical properties of the specimens are measured by the following methods, and the results are presented in the following Table 2.

(1) Impact strength: Impact strength (¼") is measured according to ASTM D256. The average value and standard deviation of 5 specimens are as shown below.

(2) Fluidity: Fluidity (260° C., 5 kg) is measured according to ASTM D1238 and presented as melt index (MI).

(3) Thermal distortion temperature: Heat resistance (18.5 kg) is measured according to ASTM D648.

(4) Gloss) (20°: Gloss is measured according to ASTM D523

TABLE 2

|  | Examples | | | Comparative Examples | | | |
| --- | --- | --- | --- | --- | --- | --- | --- |
|  | 1 | 2 | 3 | 1 | 2 | 3 | 4 |
| Impact strength average value (kgf · cm/cm) | 45 | 55 | 46 | 35 | 37 | 25 | 55 |
| Impact strength standard deviation | 0.9 | 0.7 | 0.6 | 0.8 | 0.7 | 9.5 | 0.6 |
| Fluidity (g/10 min) | 34 | 31 | 34 | 44 | 40 | 50 | 26 |
| Thermal distortion temperature (° C.) | 90 | 86 | 86 | 78 | 76 | 73 | 80 |
| Gloss (20°) | 82.9 | 82 | 81.5 | 82.3 | 80.7 | 82.4 | 20 |

It can be seen from Tables 1 and 2 that the products of Examples 1 to 3 of the invention have excellent impact strength, heat resistance, and injection molding appearance. Moreover, since they have excellent gloss, they may be used without being painted.

On the other hand, the products of Comparative Example 1 using a polyester resin with an intrinsic viscosity outside of the range of the invention and Comparative Example 2 using a polycarbonate resin with a weight average molecular weight outside of the range of the invention have deteriorated impact strength and heat resistance. Also, the product of Comparative Example 3 that did not use an acryl-based resin has deteriorated impact strength and heat resistance. In particular, the product of Comparative Example 3 has a high deviation in physical properties. Also, when the impact-reinforcing agent with a functional group is used and an acryl-based resin is not used as in Comparative Example 4, not only the fluidity and heat resistance but also the gloss are significantly deteriorated.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyester/polycarbonate alloy resin composition comprising:
    (A) about 100 parts by weight of a mixed resin including (A-1) about 10 to about 60 wt % of a polycarbonate resin having a weight average molecular weight ranging from about 30,000 to about 200,000 g/mol, and (A-2) about 40 to about 90 wt % of a polyester resin having an intrinsic viscosity of about 0.85 to about 1.52 dl/g;
    (B) about 0.1 to about 10 parts by weight of an acryl-based resin, wherein the acryl-based resin (B) is a terpolymer comprising an alkyl ester (meth)acrylate monomer, an ester (meth)acrylate monomer, or a combination thereof; an aromatic vinyl monomer comprising styrene, o-ethyl styrene, m-ethyl styrene, p-ethyl styrene, alpha methyl styrene or a combination thereof; and an unsaturated nitrile monomer comprising acrylonitrile, methacrylonitrile, ethacrylonitrile, or a combination thereof; and
    (C) about 1 to about 30 parts by weight of an impact-reinforcing agent.

2. The polyester/polycarbonate alloy resin composition of claim 1, wherein the polycarbonate resin (A-1) has a weight average molecular weight ranging from about 30,000 to about 50,000 g/mol.

3. The polyester/polycarbonate alloy resin composition of claim 1, wherein the polycarbonate resin (A-1) is prepared by reacting one or more diphenols with phosgene, halogen formate, carbonate ester, or a combination thereof.

4. The polyester/polycarbonate alloy resin composition of claim 1, wherein the polyester resin (A-2) comprises polybutylene terephthalate.

5. The polyester/polycarbonate alloy resin composition of claim 1, wherein the polyester resin (A-2) has an intrinsic viscosity [η] of about 1.03 to about 1.22 dl/g.

6. The polyester/polycarbonate alloy resin composition of claim 1, wherein the impact-reinforcing agent (C) comprises a core-shell type copolymer, a linear olefin-based copolymer, or a combination thereof.

7. The polyester/polycarbonate alloy resin composition of claim 6, wherein the core-shell type copolymer comprises a rubbery polymer obtained by polymerizing a monomer comprising a diene-based monomer, an acryl-based monomer, a silicon-based monomer, or a combination thereof and at least one unsaturated monomer grafted thereon, wherein the unsaturated monomer comprises an acryl-based monomer, an aromatic vinyl monomer, a unsaturated nitrile monomer, or a combination thereof.

8. The polyester/polycarbonate alloy resin composition of claim 6, wherein the linear olefin-based copolymer comprises a copolymer of an olefin-based monomer and an acryl-based monomer.

9. The polyester/polycarbonate alloy resin composition of claim 1, wherein the polyester/polycarbonate alloy resin composition further comprises an additive comprising an antibacterial agent, a heat stabilizer, an antioxidant, a release agent, a light stabilizer, a compatibilizer, a dye, an inorganic material additive, a surfactant, a coupling agent, a plasticizer, an admixture, a colorant, a stabilizer, a lubricant, an antistatic agent, a pigment, a flameproofing agent, a weather-resistance agent, a ultraviolet (UV) blocking agent, a filler, a nucleating agent, an adhesion aid, an adhesive, a flame retardant, or a combination thereof.

10. A molded product made using the polyester/polycarbonate alloy resin composition according to claim 1.

* * * * *